United States Patent
Liu et al.

(10) Patent No.: US 9,071,079 B2
(45) Date of Patent: Jun. 30, 2015

(54) POWER SUPPLY SYSTEM WITH MULTIPLE POWER SOURCES IN PARALLEL

(75) Inventors: Chu Kuang Liu, Taoyuan Hsien (TW);
Ching Long Tsai, Taoyuan Hsien (TW);
Hung Liang Cho, Taoyuan Hsien (TW);
Wei Hsin Wen, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 909 days.

(21) Appl. No.: 13/274,670

(22) Filed: Oct. 17, 2011

(65) Prior Publication Data
US 2012/0212059 A1 Aug. 23, 2012

(30) Foreign Application Priority Data
Feb. 22, 2011 (TW) .............................. 100105697 A

(51) Int. Cl.
*H02J 1/10* (2006.01)
(52) U.S. Cl.
CPC ....................................... *H02J 1/102* (2013.01)
(58) Field of Classification Search
CPC ........................................................ H02J 1/102
USPC ................................................ 307/60; 363/25
See application file for complete search history.

(56) References Cited

U.S. PATENT DOCUMENTS

| | | | |
|---|---|---|---|
| 4,034,280 A * | 7/1977 | Cronin et al. .................... | 363/25 |
| 6,091,234 A * | 7/2000 | Kitagawa ........................ | 323/244 |
| 6,256,179 B1 | 7/2001 | Yamada et al. | |
| 2007/0217108 A1 * | 9/2007 | Ozawa et al. ................. | 361/93.1 |
| 2008/0136341 A1 * | 6/2008 | Araki et al. ................ | 315/209 R |
| 2008/0197821 A1 * | 8/2008 | Hasegawa et al. ............ | 323/238 |
| 2009/0160259 A1 * | 6/2009 | Naiknaware et al. ........... | 307/82 |

FOREIGN PATENT DOCUMENTS

| | | |
|---|---|---|
| CN | 1450705 A | 10/2003 |
| CN | 1607715 A | 4/2005 |
| CN | 101106334 A | 1/2008 |

OTHER PUBLICATIONS

Office Action issued on Nov. 14, 2013 by the State Intellectual Property Office in corresponding CN Patent Application No. 201110044086.4.

* cited by examiner

*Primary Examiner* — Jared Fureman
*Assistant Examiner* — Joel Barnett
(74) *Attorney, Agent, or Firm* — Muncy, Geissler, Olds & Lowe, P.C.

(57) ABSTRACT

The present disclosure provides a power supply system. The power supply system includes a plurality of power supply devices connected in parallel. Output terminals of the plurality of power supply devices are coupled to a common supply line. Each of the plurality of power supply devices includes a DC-to-DC converter, a transformer, a switching control device, a rectifying device, and a judging device. The judging device receives a feedback voltage, an error signal and a second AC voltage to determine whether the power supply device is normal, wherein the feedback voltage is a voltage division of an output voltage on the common supply line, the error signal is an output of the switching control device, and the second AC voltage is retrieved from a second winding set of the transformer.

11 Claims, 4 Drawing Sheets

POWER SUPPLY SYSTEM WITH MULTIPLE POWER SOURCES IN PARALLEL

CROSS REFERENCE TO RELATED APPLICATIONS

This Application claims priority of Taiwan Patent Application No. 100105697, filed on Feb. 22, 2011, the entirety of which is incorporated by reference herein.

BACKGROUND OF THE INVENTION

1. Field of the Invention

The invention relates to a power supply device and more particularly to a parallel power system without an ORing device at output terminals thereof.

2. Description of the Related Art

Many modern devices and systems need backup power, a power supply with multiple power sources, or a power supply system capable of choosing a power source. If a device needs multiple power sources, there are some problems associated with combining power sources, choosing a power source, protecting a bus connected to power sources, and so on. If a parallel power system doesn't have a protective device, a system will break down during operation or operate abnormally due to failure of one power source or multiple power sources in the system. Generally, in a power system with multiple power sources in parallel, an ORing device is connected to output terminals of power sources so as to isolate power sources from supply lines.

Nevertheless, if there's no ORing device at output terminals of power sources of a power system, when power sources are connected in parallel and an output of the power system is abnormal due to failure of a DC-to-DC converter of one of power sources or other units in the circuit, the power system can't determine which one of the power sources has failed just by monitoring power sources. That is, because output voltages of DC-to-DC converters of power sources are coupled to a voltage of a bus. In this situation, if a power source which doesn't have a failure is turned off, the power system will result in a power failure and operate abnormally.

BRIEF SUMMARY OF THE INVENTION

In view of the above, the invention provides a power supply system with multiple power sources in parallel. The power supply system includes a plurality of power supply devices, wherein an output terminal of each of the plurality of power supply devices is directly connected to a common supply line. Each of the plurality of power supply devices includes a DC-to-DC converter, a transformer, a switching control device, a rectifying device, and a judging device. The DC-to-DC converter transforms a first DC voltage into a second DC voltage. The transformer comprises a first winding set and a second winding set, wherein the first winding set is coupled to the second DC voltage. The switching control device comprises a control unit and a driving unit. The control unit receives a feedback voltage captured from the common supply line and produces an error signal. The driving unit receives the error signal, segments the second DC voltage according to the error signal to produce a first AC voltage on the first winding set, and produces a second AC voltage on the second winding set. The rectifying device receives the second AC voltage and outputs a target DC voltage to the common supply line. The judging device receives the feedback voltage, the error signal and the second AC voltage to determine whether the power supply device is normal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a power supply system with multiple power sources in parallel. Output terminals of a plurality of power supply devices of the system have no ORing devices. The system can determine whether any one of the plurality of power supply devices connected in parallel is operating abnormally so that a power supply device having problems may be replaced. Therefore, the system can prevent abnormal operations from occurring.

Figure 1:
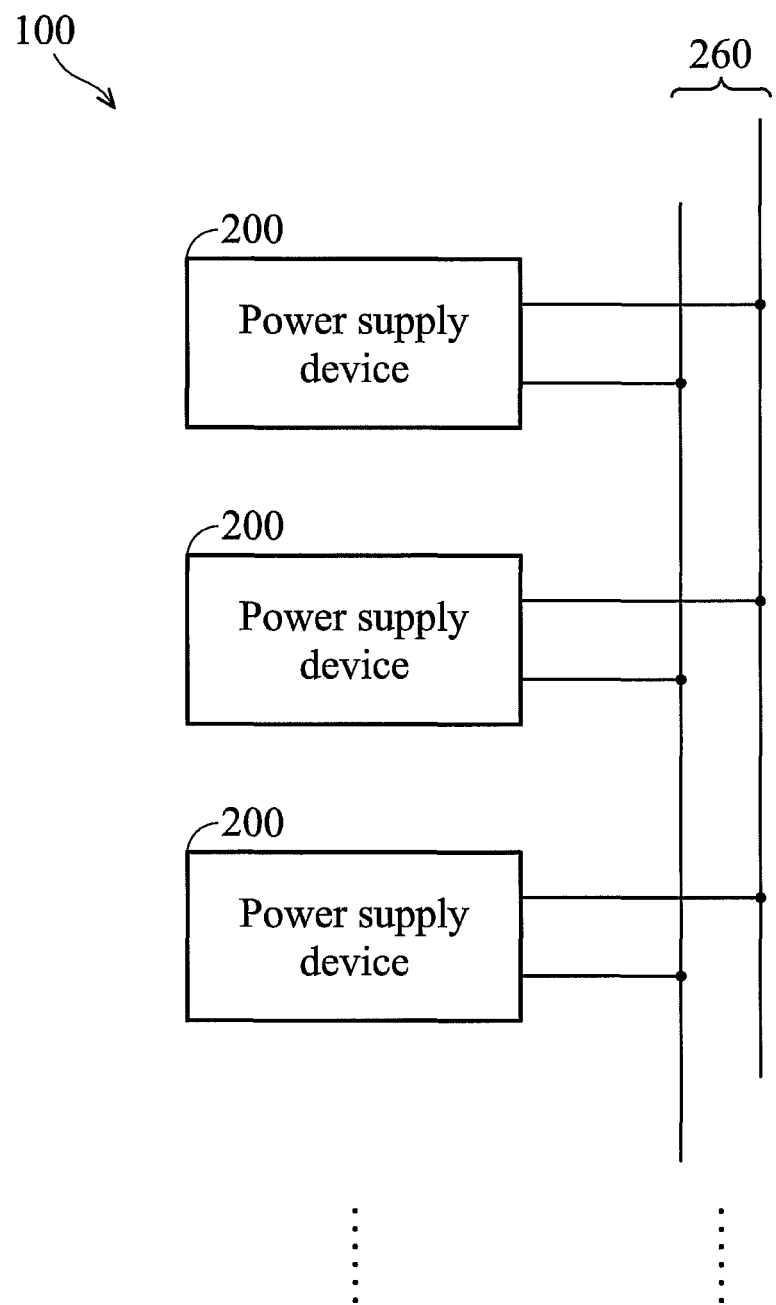
FIG. 1 is a block diagram of an exemplary embodiment of a power supply system with multiple power sources in parallel.

FIG. 1 is a block diagram of a power supply system with multiple power sources in parallel 100. Power supply devices 200 are connected in parallel and an output terminal of each power supply device 200 is directly connected to a common supply line 260.

Figure 2:
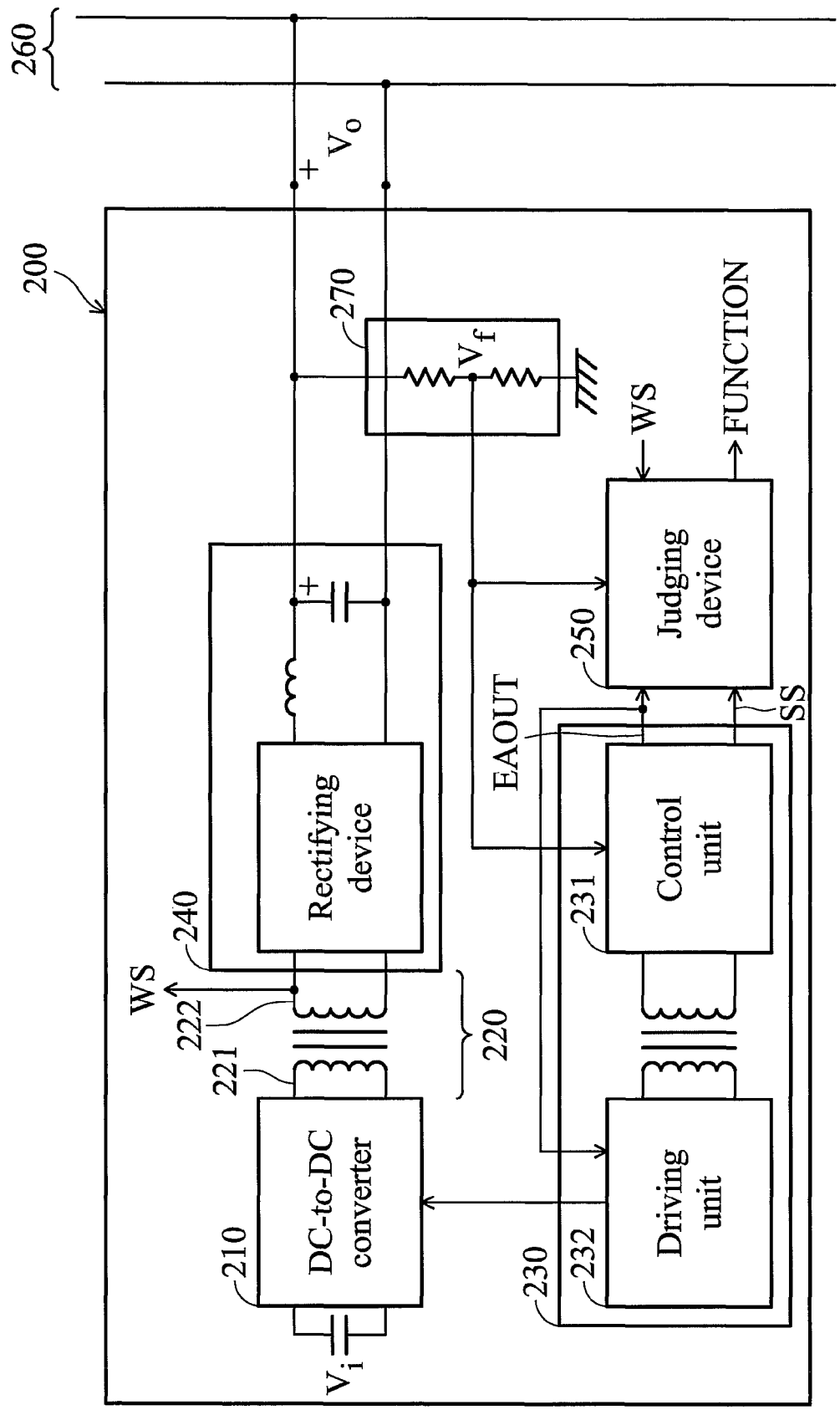
FIG. 2 is a block diagram of an exemplary embodiment of a power supply device.

FIG. 2 is a block diagram of an exemplary embodiment of a power supply device 200. The power supply device 200 comprises a DC-to-DC converter 210, a transformer 220, a switching control device 230, a rectifying device 240, and a judging device 250. The DC-to-DC converter 210 transforms a first DC voltage Vi into a second DC voltage The transformer 220 includes a first winding set 221 and a second winding set 222. The first winding set 221 is coupled to the second DC voltage. The switching control device 230 includes a control unit 231 and a driving unit 232. The control unit 231 receives a feedback voltage Vf retrieved from the common supply line 260 and produces an error signal EAOUT. The driving unit 232 receives the error signal EAOUT and segments the second DC voltage on the first winding set 221 according to the level of the error signal EAOUT so as to produce a first AC voltage on the first winding set 221 and a corresponding second AC voltage WS on the second winding set 222. The rectifying device 240 receives the second AC voltage WS on the second winding set 222 and outputs a target DC voltage Vo to the common supply line 260. The judging device 250 receives the feedback voltage Vf, the error signal EAOUT and the second AC voltage WS and determines whether the power supply device 200 functions well or not according to the feedback voltage Vf, the error signal EAOUT and the second AC voltage WS.

In the example of the FIG. 2, an isolating transformer is disposed between the driving unit 232 and the control unit 231 to electrically isolate the driving unit 232 and the control unit 231. An isolating device can be implemented by optical couplers and so on. The control unit 231 transmits relating signals (ex: error signal EAOUT, etc.) to the driving unit 232 through the isolating transformer. Also, the driving unit 232 includes a switching device (not shown) coupled to the first winding set 221. The switching device turns on and off according to the error signal EAOUT to segment the second DC voltage.

The power supply device 200 further comprises a feedback device 270 coupled to the common supply line 260. The feedback device 270 divides the target DC voltage Vo and outputs the feedback voltage Vf. The feedback voltage Vf reflects fluctuations of the target DC voltage Vo and is between an upper limit voltage and a lower limit voltage. If the level of the feedback voltage Vf is between the upper limit voltage and the lower limit voltage, the target DC voltage Vo is in the normal range. If the level of the feedback voltage Vf exceeds the range between the upper limit voltage and the lower limit voltage, the judging device 250 determines that the power supply device 200 is abnormal.

The judging device 250 further detects the error signal EAOUT and the second AC voltage WS. The judging device 250 determines whether the error signal EAOUT is larger than a first level. At the same time, the judging device 250 also determines whether the second AC voltage WS is larger than a second level for a predetermined amount of time. The second level is the noise margin of the judging device 250 when detecting the second AC voltage WS.

When the level of the error signal EAOUT is not larger than the first level and the AC voltage level of the second AC voltage WS is larger than the second level for the predetermined amount of time, the judging device 250 determines that the power supply device 200 is abnormal. When the level of the error signal EAOUT is larger than the first level but the AC voltage level of the second AC voltage WS is not larger than the second level or doesn't continue for the predetermined amount of time, the judging device 250 determines that the power supply device 200 is abnormal.

Under the condition that the level of the feedback voltage Vf doesn't exceed the range between the upper limit voltage and the lower limit voltage, the judging device 250 would further perform a judging process. When the level of the error signal EAOUT isn't larger than the first level and the AC voltage level of the second AC voltage WS is larger than the second level for the predetermined amount of time, the judging device 250 determines that the power supply device 200 is abnormal. Under the condition that the level of the feedback voltage Vf doesn't exceed the range between the upper limit voltage and the lower limit voltage, the judging device 250 would further perform a judging process. When the level of the error signal EAOUT is larger than the first level and the AC voltage level of the second AC voltage WS isn't larger than the second level or doesn't continues for the predetermined amount of time, the judging device 250 determines that the power supply device 200 is abnormal.

The judging device 250 can further receive a soft start signal SS. Once the level of the soft start signal SS doesn't continue to be higher than a third level, the judging device determines that the power supply device 200 is abnormal.

Figure 3:
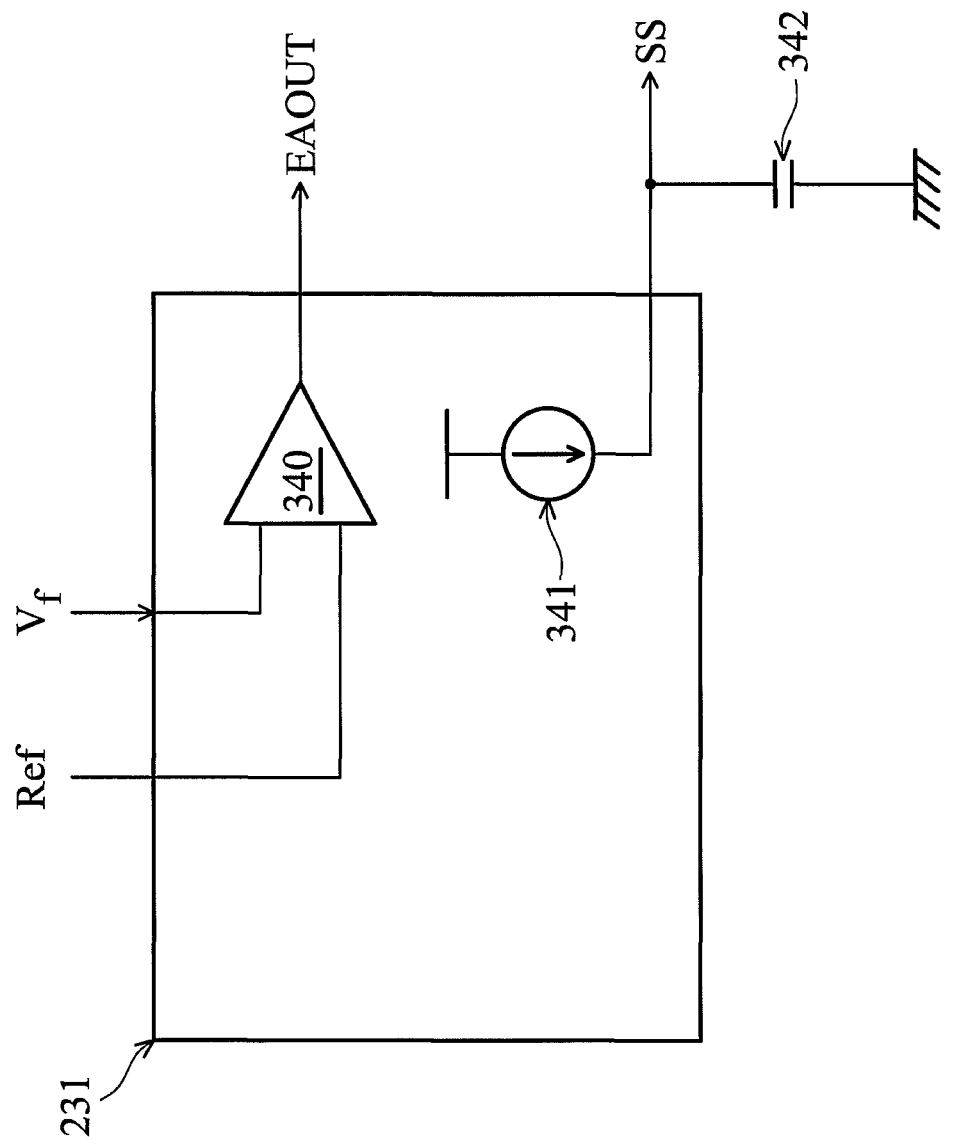
FIG. 3 is a block diagram of an exemplary embodiment of a control unit.
Figure 4:
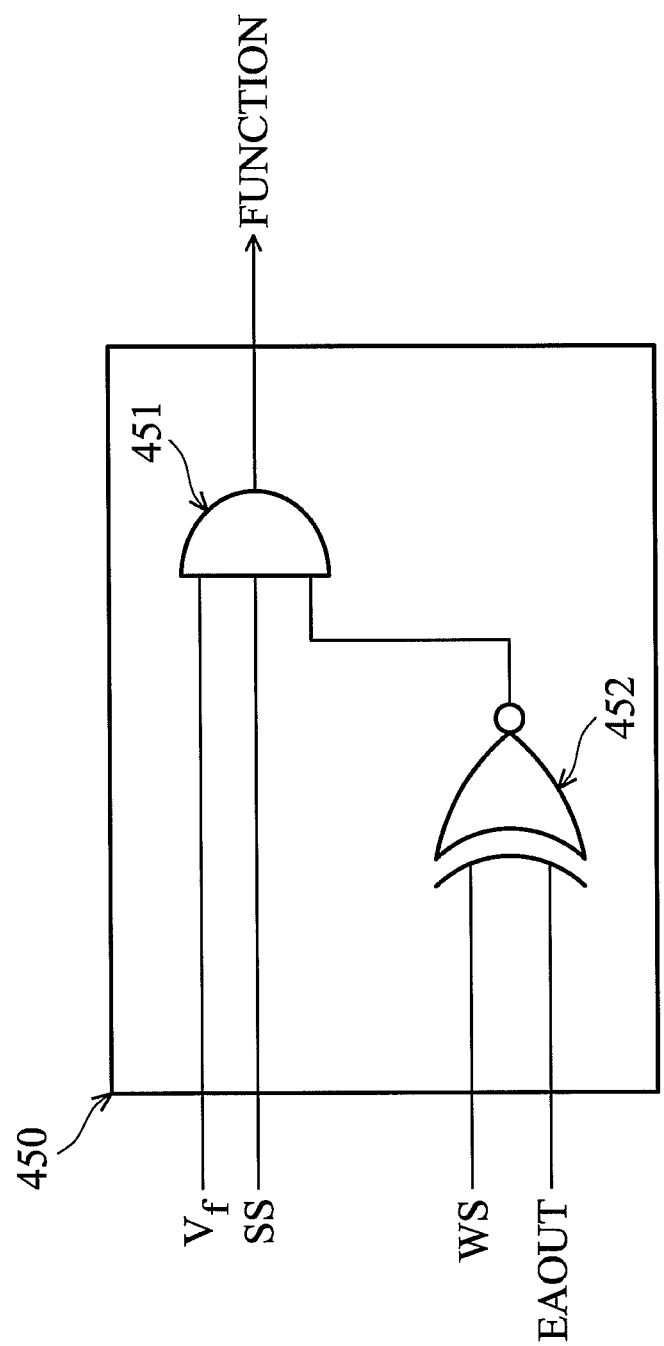
FIG. 4 is a block diagram of an exemplary embodiment of a judging device.

FIG. 3 is a block diagram of an exemplary embodiment of a control unit. The control unit 231 includes an error amplifier 340 and a constant current source 341. The error amplifier 340 receives the feedback voltage Vf and a reference voltage Ref to produce the error signal EAOUT. The constant current source 341 charges an additional capacitor device 342 to output the soft start signal SS so as to control a starting process of the power supply device The judging device 250 can be a microprocessor, a hardware which can run programs or any device such as a combination of logic gates that can carry out functions described above. The judging device 450 shown in the FIG. 4 is a possible embodiment but the judging device is not limiter thereto. The judging device 450 includes an AND gate 451 and a XNOR gate 452. The XNOR gate 452 receives the second AC voltage WS and the error signal EAOUT. The AND gate 451 receives the feedback voltage Vf, the soft start signal SS and the output of the XNOR gate 452. The AND gate 451 outputs a judging signal FUNCTION. When the judging signal FUNCTION is logic '1', the power supply device is normal. On the other hand, when the judging signal FUNCTION is logic '0', the power supply device is abnormal.

In one embodiment, when the feedback voltage Vf is between 2.35V (lower limit voltage) and 2.68V (upper limit voltage), the feedback voltage Vf is logic '1', otherwise the feedback voltage Vf is logic '0'. The range of the feedback voltage Vf between the upper limit voltage and the lower limit voltage corresponds to the condition of the target DC voltage Vo. In this embodiment, the target DC voltage Vo is 12V. If the feedback voltage Vf is between 2.35V (lower limit voltage) and 2.68V (upper limit voltage), that means the target DC voltage Vo is the normal target range. The value of the target DC voltage Vo varies with different designs.

In this embodiment, when the soft start signal SS is larger than 0.5V (third level), the soft start signal SS is logic '1', otherwise the soft start signal SS is logic '0'. When the second AC voltage WS is larger than 0.3V (second level) and continues for the predetermined amount of time, the second AC voltage WS is logic '1', otherwise the second AC voltage WS is logic '0'. 0.3V is the noise margin when detecting the second AC voltage WS. When the error signal EAOUT is larger than 0.5V (first level), the error signal EAOUT is logic '1', otherwise the error signal EAOUT is logic '0'.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply system with multiple power sources in parallel, comprising:
   a plurality of power supply devices, wherein an output terminal of each of the plurality of power supply devices is directly connected to a common supply line;
   wherein each of the plurality of power supply devices comprises:
      a DC-to-DC converter, transforming a first DC voltage into a second DC voltage;
      a transformer, comprising a first winding set and a second winding set, wherein the first winding set is coupled to the second DC voltage;
      a switching control device, comprising:
         a control unit, receiving a feedback voltage captured from the common supply line and producing an error signal; and
         a driving unit, receiving the error signal, segmenting the second DC voltage according to the error signal to produce a first AC voltage on the first winding set, and produce a second AC voltage on the second winding set;

a rectifying device, receiving the second AC voltage and outputting a target DC voltage to the common supply line; and a judging device, receiving the feedback voltage, the error signal and the second AC voltage to determine whether the power supply device is normal.

2. The power supply system as claimed in claim 1, further comprising:

a feedback device, connected to the common supply line, dividing the target DC voltage, and outputting the feedback voltage so as to make the feedback voltage reflect fluctuations of the target DC voltage Vo and be between an upper limit voltage and a lower limit voltage, wherein when a level of the feedback voltage exceeds a range between the upper limit voltage and the lower limit voltage, the judging device determines that the power supply device is abnormal.

3. The power supply system as claimed in claim 1, wherein the judging device further detects whether a level of the error signal is larger than a first level and whether an AC voltage level of the second AC voltage is larger than a second level for a predetermined amount of time.

4. The power supply system as claimed in claim 3, wherein when the level of the error signal is not larger than the first level and the AC voltage level of the second AC voltage is larger than the second level for the predetermined amount of time, the judging device determines that the power supply device is abnormal.

5. The power supply system as claimed in claim 3, wherein when the level of the error signal is larger than the first level and the AC voltage level of the second AC voltage is not larger than the second level or doesn't continue for the predetermined amount of time, the judging device determines that the power supply device is abnormal.

6. The power supply system as claimed in claim 3, wherein the second level is a noise margin of the judging device when detecting the level of the second AC voltage.

7. The power supply system as claimed in claim 3, wherein the control unit comprises an error amplifier, receiving the feedback voltage and a reference voltage to produce the error signal.

8. The power supply system as claimed in claim 1, wherein the control unit further comprises a constant current source, charging an additional capacitor device and outputting a soft start signal so as to control a starting process of the power supply device.

9. The power supply system as claimed in claim 8, wherein the judging device receives the soft start signal, and when the level of the soft start signal doesn't continue to be higher than a third level, the judging device determines that the power supply device is abnormal.

10. The power supply system as claimed in claim 3, further comprising:

a feedback device, connected to the common supply line, dividing the target DC voltage, and outputting the feedback voltage so as to make the feedback voltage reflect fluctuations of the target DC voltage Vo and be between an upper limit voltage and a lower limit voltage, wherein under the condition that the level of the feedback voltage Vf doesn't exceed a range between the upper limit voltage and the lower limit voltage, when the level of the error signal is not larger than a first level and the AC voltage level of the second AC voltage is larger than a second level for a predetermined amount of time, the judging device determines that the power supply device is abnormal.

11. The power supply system as claimed in claim 3, further comprising:

a feedback device, connected to the common supply line, dividing the target DC voltage, and outputting the feedback voltage so as to make the feedback voltage reflect fluctuations of the target DC voltage Vo and be between an upper limit voltage and a lower limit voltage, wherein under the condition that the level of the feedback voltage Vf doesn't exceed a range between the upper limit voltage and the lower limit voltage, when the level of the error signal is larger than a first level and the AC voltage level of the second AC voltage is not larger than a second level or doesn't continue for a predetermined amount of time, the judging device determines that the power supply device is abnormal.

* * * * *